United States Patent [19]
Amemiya et al.

[11] Patent Number: 5,483,964
[45] Date of Patent: Jan. 16, 1996

[54] METHOD OF DETECTING MOVING VELOCITY OF TISSUE OR BLOOD AND ULTRASONIC DIAGNOSING APPARATUS

[75] Inventors: Shinichi Amemiya; Takao Jibiki; Sumio Nishii, all of Tokyo, Japan

[73] Assignee: GE Yokogawa Medical Systems, Ltd., Tokyo, Japan

[21] Appl. No.: 441,042

[22] Filed: May 15, 1995

[51] Int. Cl.$^6$ ........................................ A61B 8/00
[52] U.S. Cl. ........................................ 128/661.09
[58] Field of Search ................... 128/661.08, 661.09, 128/661.1, 662.01

[56] References Cited

U.S. PATENT DOCUMENTS 5,163,434  11/1992  Kumazawa ................ 128/661.09
5,291,892   3/1994  O'Donnell ................ 128/661.08
5,311,870   5/1994  Fukukita et al. .......... 128/661.09
5,431,169   7/1995  Gondo ..................... 128/661.09

*Primary Examiner*—George Manuel
*Attorney, Agent, or Firm*—Moonray Kojima

[57] ABSTRACT

A plurality of ultrasonic pulses are transmitted to the inside of a living body by an ultrasonic probe and an ultrasonic echo signal is received from within the living body. An auto-correlating unit effects auto-correlation processing on the ultrasonic echo signal to produce a real-part component and an imaginary-part component. A real-part component corrector adds an offset value to the real-part component so as to generate a new real-part component. A velocity detector detects a moving velocity of a tissue or blood from the new real-part component and the imaginary-part component.

2 Claims, 4 Drawing Sheets

METHOD OF DETECTING MOVING VELOCITY OF TISSUE OR BLOOD AND ULTRASONIC DIAGNOSING APPARATUS

BACKGROUND OF THE INVENTION

1. Field of the Invention

The present invention relates to a method of detecting a moving velocity (called velocity concerning movement of a cardiac paries or the like) of a tissue or a moving velocity (called blood flow rate) of blood, which is capable of preventing a detected moving velocity from being brought to a value larger than a true velocity and to an ultrasonic diagnosing apparatus using the method.

2. Description of the Related Art

FIG. 4 is a block diagram showing one example of a conventional ultrasonic diagnosing apparatus.

The ultrasonic diagnosing apparatus 500 transmits a series of plural ultrasonic pulses to the inside of a living body at time intervals T in a plurality of directions and receives an ultrasonic echo signal from within the living body while placing an ultrasonic probe 1 on the surface of the living body. The ultrasonic echo signal received by the ultrasonic probe 1 is inputted to a quadrature detector 4 through a transmitter-receiver 2.

The quadrature detector 4 multiplies a reference signal generated from a reference signal generator 3 by the ultrasonic echo signal so as to output an in-phase component I (In-Phase) and a quadrature component Q (Quadrature) therefrom.

Each of A/D converters 5 and 6 performs A/D conversion on the in-phase component I and the quadrature component Q.

When a moving velocity of a tissue from the living body is detected, switches 7a and 8b are respectively changed over to sides indicated by solid lines in FIG. 4 so that the in-phase component I and the quadrature component Q both subjected to the A/D conversion are inputted to an auto-correlator 9 without passing through MTI (Moving Target Indication) filters 7 and 8. On the other hand, when a moving velocity of blood is detected, the switches 7a and 8b are respectively changed over to sides indicated by dotted lines in FIG. 4 so that the in-phase component I and the quadrature component Q both subjected to the A/D conversion are inputted to their corresponding MTI filters 7 and 8.

The MTI filters 7 and 8 respectively eliminate unnecessary components (low-frequency components produced from tissues such as a cardiac paries whose moving velocity is relatively low) from the in-phase component I and the quadrature component Q and input the so-processed components to the auto-correlator 9.

A multiplier 9c of the auto-correlator 9 multiplies a quadrature component Qi corresponding to an i(=2, 3, ...)th pulse of the plurality of ultrasonic pulses by a quadrature component Qi−1 corresponding to an (i−1)th pulse and outputted from a delayer 9a with a time delay and outputs the result of multiplication Qi·Qi−1 therefrom. Similarly, a multiplier 9d multiplies an in-phase component Ii by the quadrature component Qi−1 and outputs the result of multiplication Ii·Qi−1 therefrom. Similarly as well, a multiplier 9e multiplies the quadrature component Qi by an in-phase component Ii−1 generated from a delayer 9b with a time delay and outputs the result of multiplication Qi·Ii−1 therefrom. Further, a multiplier 9g multiplies the in-phase component Ii by the in-phase component Ii−1 and outputs the result of multiplication Ii·Ii−1 therefrom.

An adder 9h adds the output Qi·Qi−1 of the multiplier 9c to the output Ii·Ii−1 of the multiplier 9g and sends the result of multiplication corresponding to a real-part component (=Ii·Ii−1+Qi·Qi−1) to an average arithmetic device 9p. The average arithmetic device 9p performs average operation on real-part components Rei relative to all the i and supplies the resultant average real-part component Re to a velocity detector 12.

On the other hand, a subtracter 9k subtracts the output Ii·Qi−1 of the multiplier 9d from the output Qi·Ii−1 of the multiplier 9e and outputs the result of subtraction corresponding to an imaginary-part component Imi (=Qi·Ii−1−Ii·Qi−1) to an average arithmetic device 9q. The average arithmetic device 9q performs average operation on imaginary-part components Imi relative to all the i and outputs the resultant average imaginary-part component Im to the velocity detector 12.

The velocity detector 12 calculates a velocity v from the following equation:

$$v = k \cdot \tan^{-1}(Im/Re)$$

(where $k = c/(4\pi \cdot fo \cdot T)$ c: velocity of ultrasonic wave in living body fo: frequency of transmitted ultrasonic wave T: pulse repetitive interval T=2d/c d: diagnosis distance)

The velocity v represents the moving velocity of the tissue or blood and is inputted to a DSC 13.

The ultrasonic echo signal received by the ultrasonic probe 1 is inputted to a B mode processor 15 through the transmitter-receiver 2 separately from the above-described ultrasonic echo signal.

The B mode processor 15 generates B mode image data, based on the ultrasonic echo signal and inputs it to the DSC 13.

The DSC 13 generates data about a colored image obtained by superposing an image produced by color-coding the tissue or blood moving velocity and a B mode image on one another from the velocity v and the B mode image data.

A CRT 14 displays the colored image on a screen thereof based on the color image data.

FIG. 5 is a conceptual view for describing a relationship between a real-part component Re, an imaginary-part component Im, a velocity v and a power P.

An angle $\tan^{-1}$ (Im/Re) of a vector (Re, Im) on complex coordinates represents the velocity v and a magnitude= {Re2+Im2} represents the power P. Namely, the velocity v does not depend on the power P.

Thus, the relationship between a velocity Vb detected by the ultrasonic diagnosing apparatus 500 and a power P is represented as shown in FIG. 6. The detected velocity Vb depends upon the power P and is brought to an improper or irregular value much different from a true velocity v when the power P is lowered.

It is considered that this reason is because since unintended vectors Na and Ni produced due to noise or the like are added to an intended vector (Re, Im) and the unintended vectors are undefined as indicated by a circle NC as shown in FIG. 7, the detected velocity Vb is brought to a irregular or improper value but the range of its irregularity is brought to several times the true velocity v when the power P is low.

However, a problem arises that when the detected velocity Vb is larger than the true velocity v, the tissue or the flow of blood looks improper. A further problem arises that a color flow image unseemly comes into sight due to coloring of the image to no purpose.

SUMMARY OF THE INVENTION

With the foregoing in view, it is an object of the present invention to a method of detecting a moving velocity of a tissue or blood, which is capable of preventing a detected velocity from being brought to a value larger than a true velocity when a power P is lowered.

According to a first aspect of the present invention, there is provided a method of transmitting a series of plural ultrasonic pulses to the inside of a living body from an ultrasonic probe, receiving an ultrasonic echo signal from within the living body and detecting a moving velocity of a tissue or blood from the living body, based on a real-part component and an imaginary-part component obtained by effecting auto-correlation processing on the ultrasonic echo signal, which comprises the step of detecting a moving velocity of the tissue or blood after an offset value has been added to the real-part component.

According to a second aspect of the present invention, there is provided an ultrasonic diagnosing apparatus comprising an ultrasonic probe for transmitting a plurality of ultrasonic pulses to the inside of a living body and receiving an ultrasonic echo signal from within the living body; auto-correlating means for effecting auto-correlation processing on the received ultrasonic echo signal; moving velocity detecting means for detecting a moving velocity from a real-part component and an imaginary-part component outputted from the auto-correlating means; and real-part component correcting means provided between the auto-correlating means and the moving velocity detecting means, for adding an offset value to the real-part component.

In the tissue or blood moving-velocity detecting method and the ultrasonic diagnosing apparatus, a plurality of ultrasonic pulses are sent to the inside of a living body by an ultrasonic probe and an ultrasonic echo signal is received from within the living body. Auto-correlation processing is effected on the ultrasonic echo signal so as to produce a real-part component and an imaginary-part component. Further, an offset value is added to the real-part component so as to produce a new real-part component. Thereafter, a moving velocity of a tissue or blood is detected based on the new real-part component and the imaginary-part component.

When the original real-part and imaginary-part components are respectively represented as Re and Im and the offset value is represented as r, the following inequality is given:

$$\tan^{-1}\{Im/(Re+r)\} < \tan^{-1}(Im/Re)$$

If the offset value r is now set to an appropriate value, then a velocity v can be prevented from reaching a value so larger than a true velocity when a power P is reduced.

Since the original real-part component Re becomes sufficiently larger than the offset value r when the power P is large, the following inequality is given:

$$\tan^{-1}\{Im/(Re+r)\} \doteq \tan^{-1}(Im/Re)$$

It is possible to neglect the influence of addition of the offset value r to the real-part component.

Thus, according to the tissue or blood moving-velocity detecting method and the ultrasonic diagnosing apparatus, when a power P is lowered, a detected velocity can be prevented from becoming larger than a true velocity. Therefore, tissues or blood flows can be prevented from being misjudged as improper. Further, a color flow image can be prevented from unseemly coming into sight due to coloring of the image to no purpose.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENT

The present invention will hereinafter be described in further detail using a preferred embodiment illustrated in the accompanying drawings. The present invention is not necessarily limited to the above embodiment.

Figure 1:
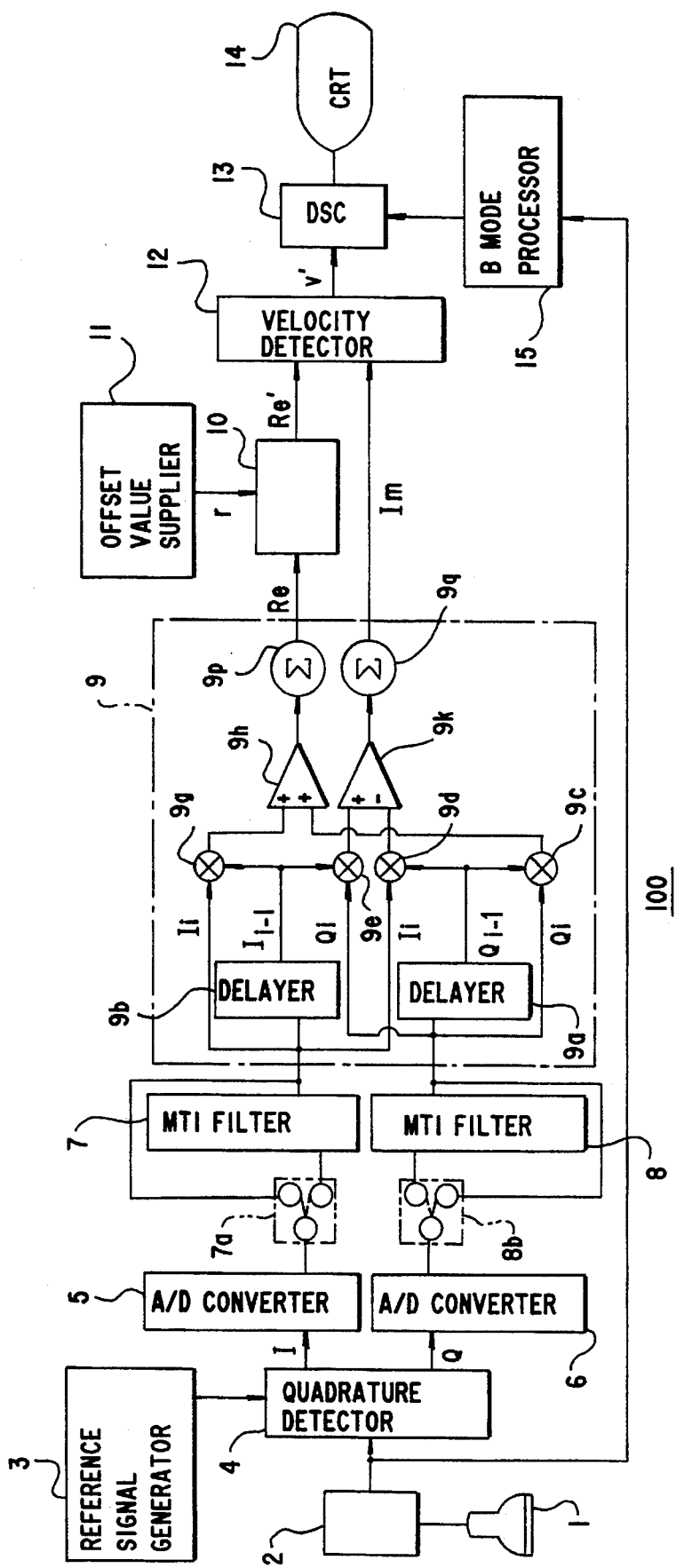
FIG. 1 is a block diagram showing one embodiment of an ultrasonic diagnosing apparatus according to the present invention.

FIG. 1 is a block diagram showing one embodiment of an ultrasonic diagnosing apparatus according to the present invention.

The ultrasonic diagnosing apparatus 100 transmits a series or train of plural ultrasonic pulses to the inside of a living body at time intervals T in a plurality of directions and receives an ultrasonic echo signal from within the living body while placing an ultrasonic probe 1 on the surface of the living body. The ultrasonic echo signal received by the ultrasonic probe 1 is inputted to a quadrature detector 4 through a transmitter-receiver 2.

The quadrature detector 4 multiplies a reference signal generated from a reference signal generator 3 by the ultrasonic echo signal so as to output an in-phase component I and a quadrature component Q.

Each of A/D converters 5 and 6 performs A/D conversion on the in-phase component I and the quadrature component Q.

When a moving velocity of a tissue from the living body is detected, switches 7a and 8b are respectively changed over to sides indicated by solid lines in FIG. 1 so that the in-phase component I and the quadrature component Q both subjected to the A/D conversion are inputted to an auto-correlator 9 without passing through MTI filters 7 and 8. On the other hand, when a moving velocity of blood is detected, the switches 7a and 8b are respectively changed over to sides indicated by dotted lines in FIG. 1 so that the in-phase component if and the quadrature component Q both subjected to the A/D conversion are inputted to their corresponding MTI filters 7 and 8.

The MTI filters 7 and 8 respectively eliminate unnecessary low-frequency components from the in-phase component I and the quadrature component Q and input the so-processed components to the auto-correlator 9.

A multiplier 9c of the auto-correlator 9 multiplies a quadrature component Qi corresponding to an i(=2, 3, ...)th pulse of the plurality of ultrasonic pulses by a quadrature component Qi–1 corresponding to an (i–1)th pulse and outputted from a delayer 9a with a time delay and outputs the result of multiplication Qi·Qi–1 therefrom. Similarly, a multiplier 9d multiplies an in-phase component Ii by the quadrature component Qi–1 and outputs the result of multiplication Ii·Qi–1 therefrom. Similarly as well, a multiplier 9e multiplies the quadrature component Qi by an in-phase component Ii–1 generated from a delayer 9b with a time delay and outputs the result of multiplication Qi·Ii–1 therefrom. Further, a multiplier 9g multiplies the in-phase component Ii by the in-phase component Ii–1 and outputs the result of multiplication Ii·Ii–1 therefrom.

An adder 9h adds the output Qi·Qi–1 of the multiplier 9c to the output Ii·Ii–1 of the multiplier 9g and sends the result of multiplication corresponding to a real-part component Rei (=Ii·Ii–1+Qi·Qi–1) to an average arithmetic device 9p. The average arithmetic device 9p performs average operation on real-part components Rei relative to all the i and supplies the resultant average real-part component Re to a real-part component corrector 10.

On the other hand, a subtracter 9k subtracts the output Ii·Qi–1 of the multiplier 9d from the output Qi·Ii–1 of the multiplier 9e and outputs the result of subtraction corresponding to an imaginary-part component Imi (=Qi·Ii–1–Ii·Qi–1) to an average arithmetic device 9q. The average arithmetic device 9q performs average operation on imaginary-part components Imi relative to all the i and outputs the resultant average imaginary-part component Im to a velocity detector 12.

The real-part component corrector 10 adds an offset value r inputted from an offset value supplier 11 to the real-part component Re to produce a new real-part component Re' (=Re+r), which is outputted to the velocity detector 12.

Now, when the moving velocity of the tissue from the living body is detected, for example, the offset value r may preferably be set to about several times the real-part component Re at the time of non-application of a signal to suppress noise corresponding to an unintended velocity component. On the other hand, when the moving velocity of the blood is detected, the offset value r may preferably be set to about several times the value corresponding to any moving velocity ranging from 2 cm/s to 3 cm/s to suppress or control a tissue moving component indicative of an unintended velocity component.

The velocity detector 12 calculates a velocity v' from the following equation. Further, the velocity detector 12 inputs the result of calculation to a DSC 13.

$$v' = k \cdot \tan^{-1}(Im/Re')$$

(where k=c/(4π·fo·T)

c: velocity of ultrasonic wave in living body
fo: frequency of transmitted ultrasonic wave
T: pulse repetitive interval T=2d/c
d: diagnosis distance)

The ultrasonic echo signal received by the ultrasonic probe 1 is inputted to a B mode processor 15 through the transmitter-receiver 2 separately from the above-described ultrasonic echo signal.

The B mode processor 15 generates B mode image data, based on the ultrasonic echo signal and inputs it to the DSC 13.

The DSC 13 generates data about a colored image obtained by superposing an image produced by color-coding the tissue or blood moving velocity and a B mode image on one another from the velocity v' and the B mode image data.

A CRT 14 displays the colored image on a screen thereof based on the color image data.

Figure 2:
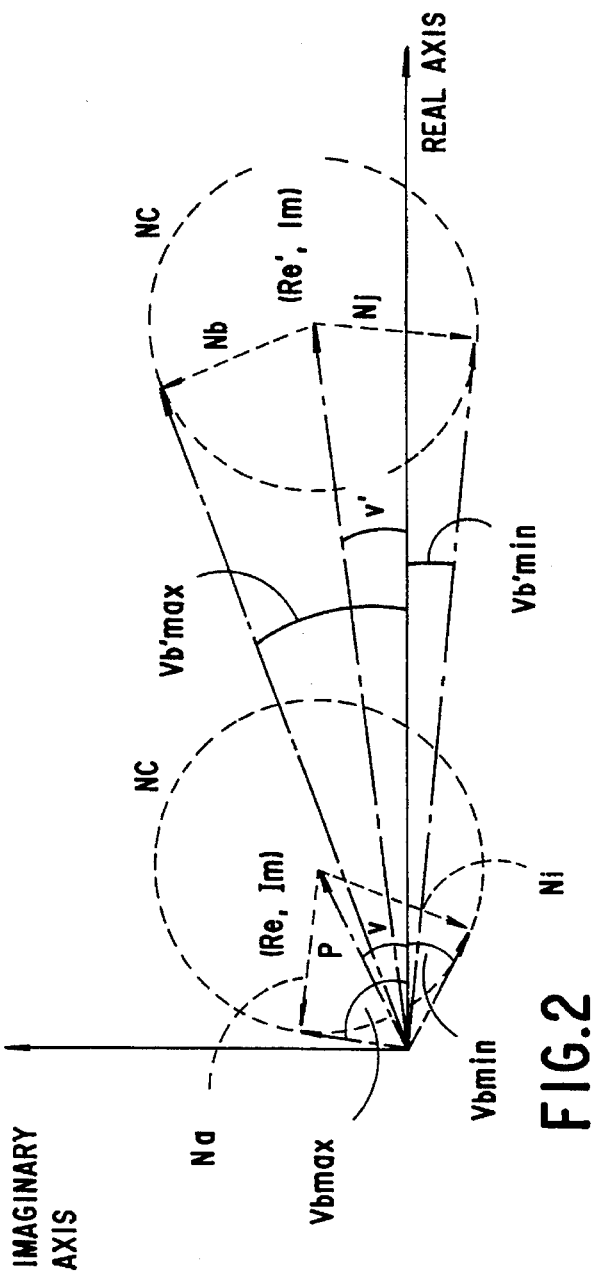
FIG. 2 is a conceptual view for describing a relationship between an original real-part component Re, an original imaginary-part component Im, a true velocity v, a power P, a new real-part component Re' and a detected velocity v'.

FIG. 2 is a conceptual view for describing a relationship between an original real-part component Re, an original imaginary-part component Im, a true velocity v, a power P, a new real-part component Re' and a detected velocity v'.

An angle tan–1(Im/Re) of a vector (Re, Im) represents the true velocity v and a magnitude={Re2+Im2} represents the power P. An angle tan–1(Im/Re') of a vector (Re', Im) represents the detected velocity v'.

When unintended vectors Na and Ni are added to the original vector (Re, Im), detected velocities Vbmin to Vbmax are brought to a range several times the true velocity v upon reduction in the power P as is understood from FIG. 2. However, detected velocities Vb' min to Vb' max fall into a velocity range lower than the true velocity v even when the unintended vectors Na and Ni are added to the new vector (Re', Im).

Figure 3:
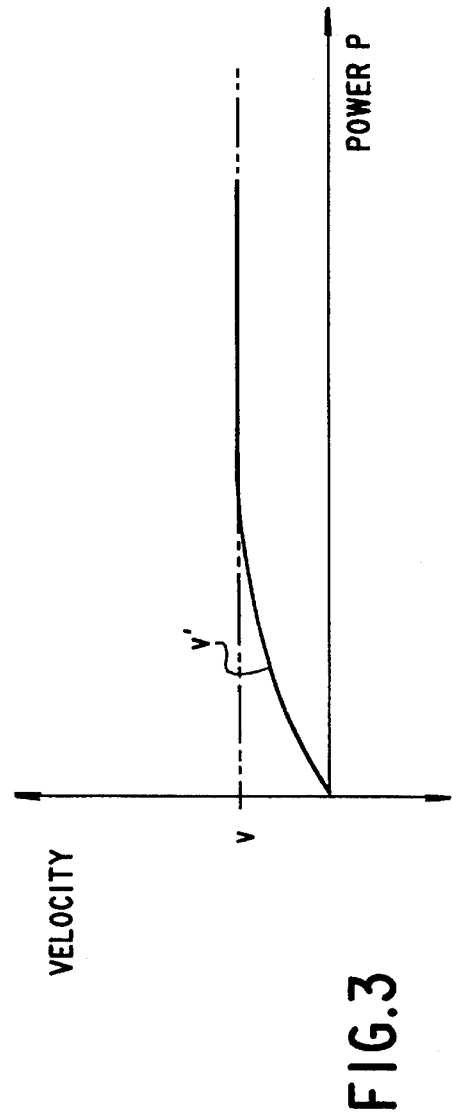
FIG. 3 is a conceptual view for describing a relationship between the power P and the detected velocity v'.
Figure 4:
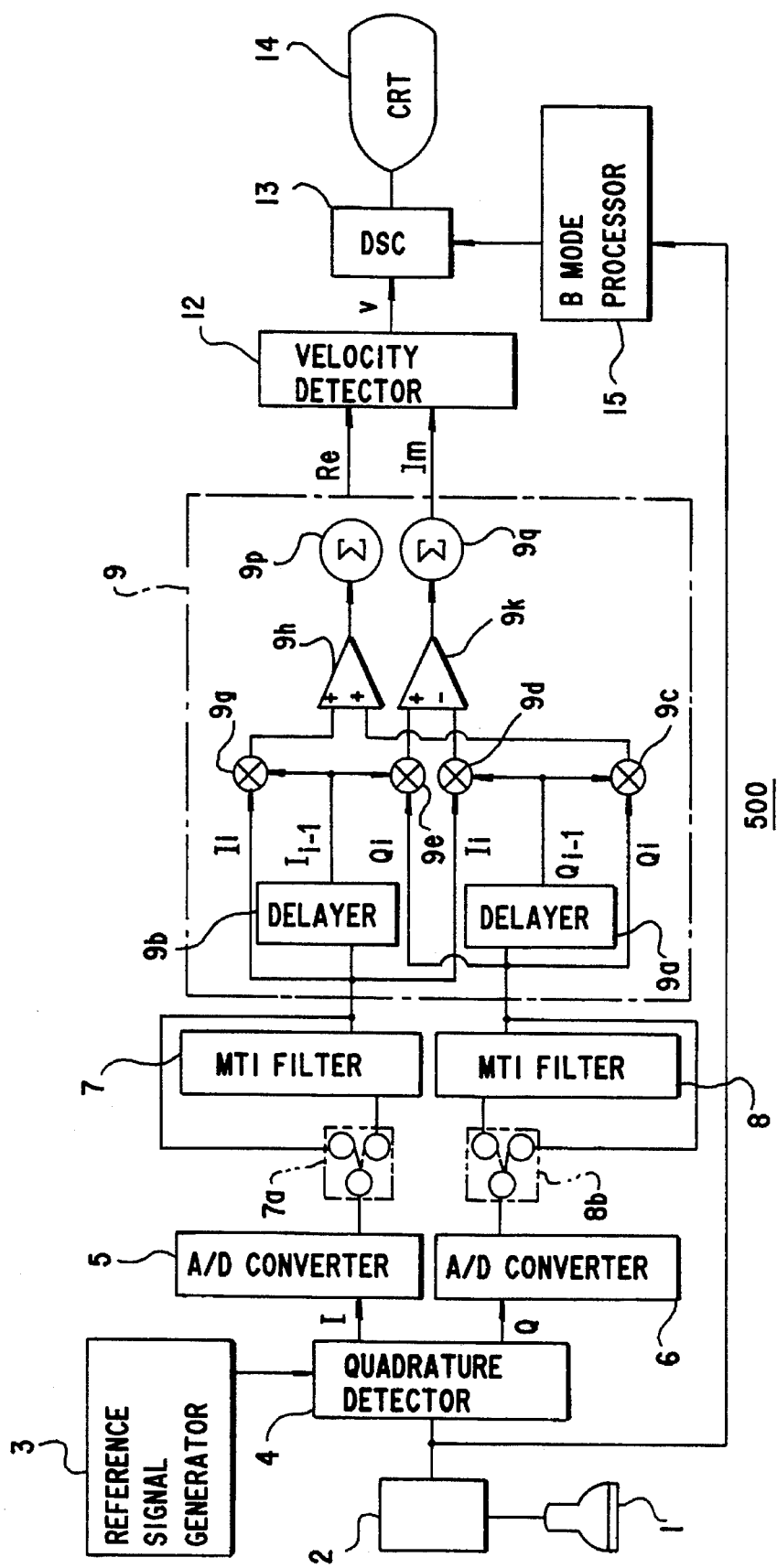
FIG. 4 is a block diagram illustrating one example of a conventional ultrasonic diagnosing apparatus.
Figure 5:
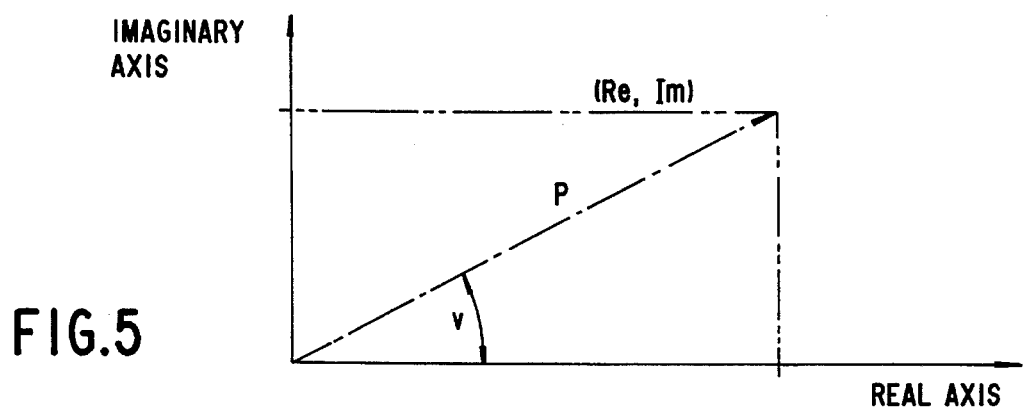
FIG. 5 is a conceptual view for describing a relationship between a real-part component Re, an imaginary-part component Im, a true velocity v and a power P.
Figure 6:
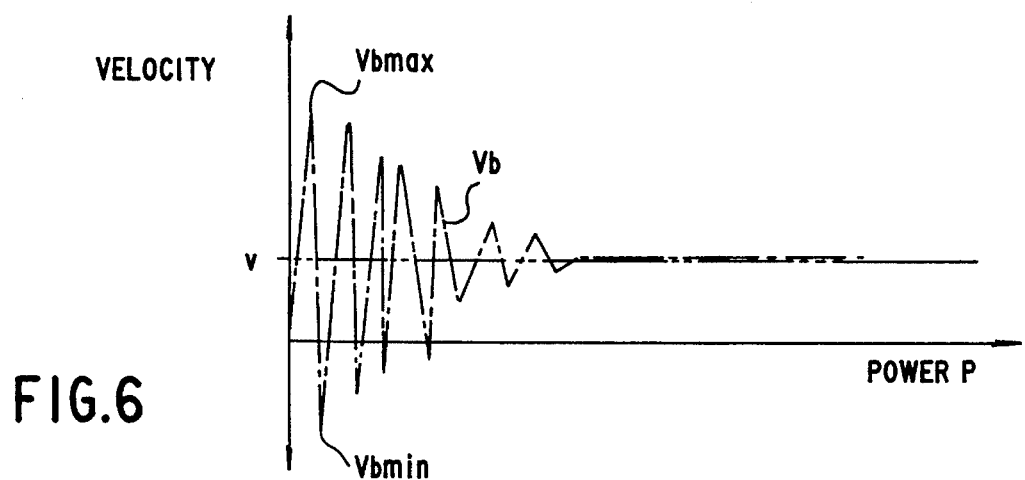
FIG. 6 is a conceptual view for describing a relationship between a power P and a detected velocity Vb.
Figure 7:
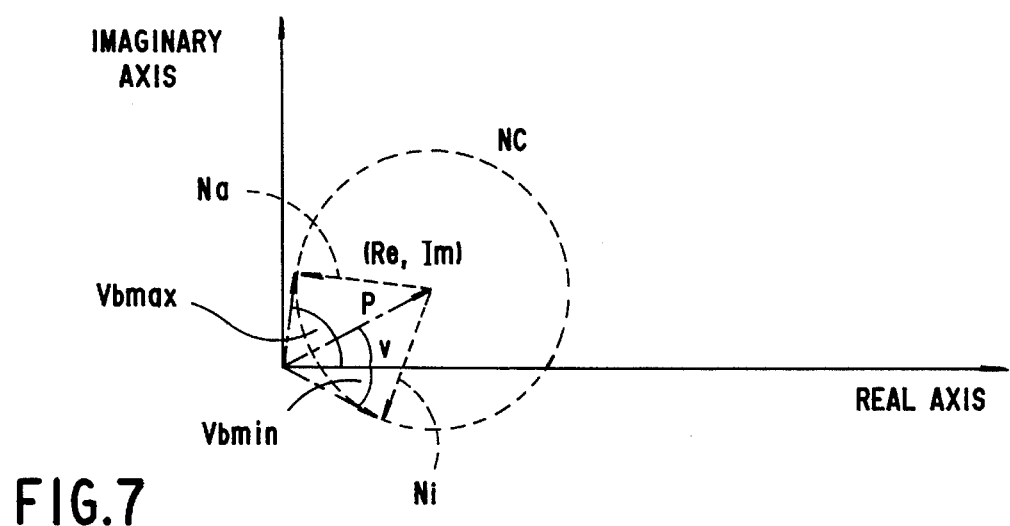
FIG. 7 is a view for describing a turbulence of the detected velocity Vb.

Therefore, the relationship between the velocity v' and the power P is represented as shown in FIG. 3. The velocity v' is restrained from being set to a value larger than the true velocity v. It is also possible to prevent tissues or blood flows from improperly appearing in sight. Further, a color flow image can be prevented from unseemly coming in sight due to coloring of the image to no purpose.

Having now fully described the invention, it will be apparent to those skilled in the art that many changes and modifications can be made without departing from the spirit or scope of the invention as set forth herein.

What is claimed is:

1. A method of transmitting a series of plural ultrasonic pulses to the inside of a living body from an ultrasonic probe, receiving an ultrasonic echo signal from within the living body and detecting a moving velocity of a tissue or blood from the living body, based on a real-part component and an imaginary-part component obtained by effecting auto-correlation processing on the ultrasonic echo signal, which comprises the step of:

detecting a moving velocity of the tissue or blood after an offset value has been added to the real-part component.

2. An ultrasonic diagnosing apparatus comprising:

an ultrasonic probe for transmitting a plurality of ultrasonic pulses to a living body and receiving an ultrasonic echo signal from within the living body;

auto-correlating means for effecting auto-correlation processing on the received ultrasonic echo signal;

moving velocity detecting means for detecting a moving velocity from a real-part component and an imaginary-part component outputted from said auto-correlating means; and real-part component correcting means provided between said auto-correlating means and said moving velocity detecting means, for adding an offset value to the real-part component.

\* \* \* \* \*